June 6, 1939.   J. D. SULLIVAN   2,160,924
REFRACTORY MATERIAL
Original Filed Feb. 11, 1937
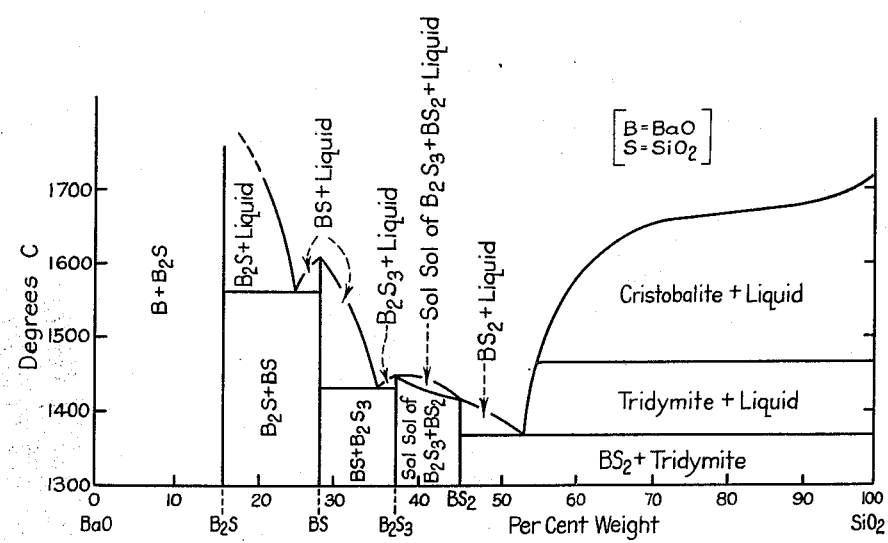
System BaO-SiO$_2$
INVENTOR.
John D. Sullivan.
BY
ATTORNEYS.

Patented June 6, 1939

2,160,924

UNITED STATES PATENT OFFICE 2,160,924

REFRACTORY MATERIAL

John D. Sullivan, Columbus, Ohio, assignor to Battelle Memorial Institute, Columbus, Ohio, a corporation of Ohio Original application February 11, 1937, Serial No. 125,283. Divided and this application May 24, 1937, Serial No. 144,359

14 Claims. (Cl. 106—9)

My invention relates to refractory material. It has to do, particularly, with the production of a refractory material which has a high melting point and which is chemically and structurally constituted to withstand the corrosive action of slags, gases, metals and other materials at high temperatures. It relates, especially, to the production of a refractory material which is essentially basic in character.

One of the best basic refractories hitherto available is magnesium oxide which is commonly called magnesite. This magnesite usually takes the form of dead-burned magnesite, although electrically sintered magnesite is sometimes used. Ordinarily, the magnesite is reduced to granular form and then fabricated, either alone or with other materials to form furnace linings, such as bottoms, walls, ports, et cetera, or to form magnesite brick, crucibles or other articles.

When magnesite is used for the formation of bottoms of basic open-hearth steel furnaces, it is ordinarily mixed with a substantial amount of slag which bonds the magnesite grains but renders the lining less refractory and less basic. Also, the time required for lining a furnace bottom with a composition of magnesite and slag is unduly long.

When magnesite is used in lining the walls or ports of a furnace, it is customary to provide some sort of binder for the magnesite grains. When clay, sodium silicate, and other materials now commonly used are employed as binding agents, the resultant product is less refractory, less basic and is more susceptible to intersticial attack. Sometimes, electrically sintered magnesite grains are mixed with a finely ground wet slurry of the same material which serves as a binder. However, while a furnace wall structure so formed has a tendency to become extremely hard on the interior surface thereof owing to the heat of the furnace, the underlying material being subject to a lesser degree of heat has a tendency to lose its bond by virtue of dehydration. As a result, the material disintegrates and the shell-like structure which remains is inadequate for the purposes intended.

Magnesite brick are ordinarily produced by pressing together grains of dead-burned magnesite and, usually, by firing such brick at elevated temperatures. Such brick are basic in nature but they are susceptible to spalling on rapid temperature changes, and are also characterized by poor load-bearing capacity at elevated temperatures.

Failure of prior are magnesite brick often occurs because of the failure of the bond between the magnesite grains. Frequently, the bond either melts or loses its strength at too low a temperature or it is attacked by slags, metals or vapors to which it is exposed, with the result that intersticial penetration of such slags, metals or vapors causes failure. However, another type of failure arises as a result of shrinkage of the magnesite grains when the brick are subjected to high temperatures.

Magnesite grains are usually prepared by dead-burning row magnesite which comprises subjecting the latter to a temperature sufficient to decompose the carbonate, to convert most of the resulting magnesium oxide to the periclase form, and to effect partial shrinkage of the product. However, the firing is not at high enough temperature or for a sufficiently prolonged period to effect complete shrinkage or elimination of porosity within the grains. Consequently, when such brick are subjected in service to a high temperature on the inner face, and with a temperature gradient throughout the brick, the hot face tends to shrink excessively and to a greater extent than the body, with the result that spalling by peeling occurs.

Another disadvantage of prior art magnesite brick is that they are either extremely fragile before firing or necessitate the use of an extraneous bond that is detrimental to refractoriness. They are also weak between ordinary temperatures and the temperatures at which they are fired in the kiln. This necessitates an expensive method of firing, since the brick cannot be stacked and must be boxed with silica brick which bear the load.

Magnesite crucibles are usually made from electrically sintered magnesite. One drawback of such crucibles is their poor resistance to thermal shock.

If magnesite could be fused completely and satisfactorily fabricated to produce the desired product, a superior refractory would result. Magnesium oxide, because of its high melting point and resistance to corrosion by basic slags, is an ideal refractory material. However, since the melting point of magnesium oxide is about 2800 degrees C., it is not puracticable to melt it. In the first place, it can only be melted in an electric furnace and, when so melted, it reacts with the carbon electrodes thereof at temperatures much below the melting point of the magnesium oxide to give metallic magnesium and carbon monoxide. The reaction is more rapid with increasing temperature and is quite vigorous at the melting point of the magnesium oxide. As a result, there is an undue loss of the magnesium oxide by reduction and vaporization and, even if the magnesium oxide can be melted, the product is quite porous because of the blow-holes formed therein.

One meritorious solution of this problem of melting magnesium oxide has involved melting with the magnesium oxide another basic oxide such as barium oxide, calcium oxide, or both to lower the melting point. It was possible in this manner to obtain a melting point sufficiently low to permit casting.

One of the objects of this invention is to produce a high melting point refractory of an essentially basic character and with chemical and structural characteristics which will be such as to impart to the product a longer life than prior art products such as those formed by bonding together grains of dead-burned magnesite or the like.

Another object of this invention is to produce a basic refractory, highly refractory in nature, and with physical and chemical properties superior to those of prior art products.

Another object is to produce such products by the use of comparatively cheap and plentiful materials, and at a comparatively low cost.

Other objects of this invention will appear as this description progresses.

This application is a division of my application, Serial No. 125,283, filed February 11, 1937, Refractory material, which is a continuation in part of my co-pending application, Serial No. 753,637, filed November 19, 1934, now Patent 2,113,818 issued April 12, 1938, Fused refractory and method of making the same.

My invention contemplates the use of magnesium oxide as a primary constituent of my refractory composition and further contemplates the use of barium oxide and silica in this composition and playing important parts therein. The refractory composition in some cases is made by fusion, but in others the step of fusion is not employed. My invention further contemplates the use of my composition for the making of refractory products.

Where the step of fusing is to be utilized, the ingredients are proportioned and mixed to yield a product of specified chemical composition. After such preparation, the mass is fused in a furnace capable of yielding temperatures high enough for this purpose. For example, electric furnaces may be used. The use of barium oxide and silica substantially reduces the melting point; so the loss of magnesium oxide by reaction with the carbon electrodes of the furnace is substantially reduced.

The molten mass may be solidified and, by means well known to the art, reduced to desired sizes and forms for such uses as fabricating refractory products, such as furnace linings, brick or other articles. The fused mass may also be cast into molds of predesigned shapes. The lowering of the melting point permits casting, which is not possible when magnesia alone is used.

When a molten mass of magnesium oxide, barium oxide, and silica solidifies, the primary material of crystallization is periclase. That of secondary crystallization is barium silicate. The silica and barium oxide substantially all unite to form barium silicate unless a large excess of silica is present. Likewise, the magnesia crystallizes as periclase and not as magnesium silicate unless a large excess of silica is present. The particular silicate of barium formed depends on the ratio of BaO to $SiO_2$ present. The solidified mass is, therefore, a nucleus of crystals of periclase surrounded by and interpenetrated with crystals of barium silicate.

The figure is a constitutional diagram of the system $BaO$-$SiO_2$, and its use will facilitate the description of the refractory material of my invention.

The diagram shows the barium silicate or silicates formed on solidification of a molten mass of barium oxide and silica. For example, a molten mass containing 20 per cent of $SiO_2$ and 80 per cent of BaO, on solidification will comprise a mixture of $2BaO \cdot SiO_2$ and $BaO \cdot SiO_2$ in proportions defined by the lever-arm relationship known to all skilled in interpretation of constitutional diagrams. When a molten mass of MgO, BaO, and $SiO_2$ is cooled to permit solidification, MgO crystallizes out first. The BaO and $SiO_2$ act essentially as though no MgO were present. Therefore, the ratio of BaO to $SiO_2$ determines the silicate formed. If $SiO_2$ is present in amounts greater than approximately 44 per cent of the sum of the BaO and $SiO_2$, some magnesium silicate may form. Petrographic examination of a large number of samples showed that, in most cases, magnesium silicates were absent or present in only small amounts, unless the $SiO_2$ was present in amounts greater than that required to unite with the barium present to form $BaO \cdot 2SiO_2$.

For reasons that will appear later, I may want the material of secondary crystallization, that is, the barium silicate to be highly refractory. To obtain a highly refractory mass I choose a ratio of $BaO:SiO_2$ of high melting point. The diagram shown in the drawing makes it clear that a mixture comprising 80 per cent of barium oxide and 20 per cent of silica is more refractory than one containing 60 per cent of barium oxide and 40 per cent of silica. In my invention, I prefer that the molecular ratio of BaO to $SiO_2$ will not be greater than 2 to 1.

I have discovered that the masses made by this invention, when ground, are cementitious and possess hydraulic properties. I believe that the hydraulic and cementitious properties are due to the barium silicate or silicates produced in the manner indicated above.

To illustrate the properties of the material made according to that form of my invention involving fusion, I shall give as an example the manufacture of a basic brick. The solidified material is properly sized and graded, and sufficient water added to temper the material and condition it physically for fabricating into shape. I may, for example, add the tempering water immediately before fabricating, or I may allow the tempered mass to remain for a time before fabricating.

On addition of water, the barium silicate exerts its hydraulic effect, and a cementitious bond is formed. The brick so processed, after the cement sets, is strong physically, and can be handled without exercising undue care. I may use this brick in the unfired or unburned state. If an unfired brick is used in a furnace, the hydraulic bond is converted to a ceramic one, at least in the portion subjected to high temperatures. For many purposes, however, I prefer to burn the brick by methods well known to the art. I have discovered that the brick possesses excellent strength from room temperature up to and above that required in firing. In firing, the hydraulic bond is converted to a ceramic one, and the fired brick possesses excellent physical properties.

Among the outstanding properties of brick made according to my invention are refractoriness, strength under load, especially at elevated temperatures, and resistance to slaking by steam. This example of a method of making a brick is only illustrative, and other refractory articles or products, made by my invention, will in many cases, be more important, industrially.

In manufacturing refractory articles from the product made by my invention, I may take advantage of the ratio of BaO to SiO2 to govern shrinkage, or the temperature required to effect a given shrinkage. If an article is made from grains of fused material, it is obvious, of course, that the grains themselves are non-porous. The intersticial spaces between them can be decreased by subjecting the mass to a high enough temperature to permit either sintering or pyroplastic flow to occur.

My observations indicate that the amount of shrinkage taking place in my refractory masses is dependent to a large extent on the quantity of liquid phase present. Thus in a MgO-BaO-SiO2 refractory the MgO is the most refractory phase. On heating, the first liquid to form is silicate. The ratio of BaO:SiO2 governs the melting point of the silicate or silicates present. The diagram of the drawing shows that in the binary system a definite temperature is necessary to obtain a liquid phase, and that the amount of liquid formed at any temperature depends on the BaO:SiO2 ratio. The diagram shows, for example, that a higher temperature is required to produce any liquid phase if the ratio of BaO to SiO2 is 4:1 than if it is 3:2.

If I elect to cast the refractory material, I produce a product characterized by zero porosity and which is, therefore, even more resistant to attack by slags and other molten materials.

A fabricated refractory made from grains of fused and solidified material is highly desirable because there are no internal voids or porosity within the grains.

In the case of rammed linings, brick or other articles made from highly refractory fused grains, the only porosity lies in the intersticial spaces between the refractory grains. By judicious grading and sizing, the total porosity can be reduced to a small value. When such linings, brick or other articles, so made, are used at elevated temperatures, they are characterized by volume stability, as are the cast products. This is of particular value where extremely high temperatures are employed such as in electric furnaces.

My invention contemplates not only use of fused material, but also takes advantage of the cementitious bond of barium silicate. A modified form of my invention, therefore, comprises using grains of magnesium oxide and barium silicate as a bond. I have, for example, added to dead-burned magnesite various barium silicates, and pressed or fabricated the mass into shapes. These masses have been tested in both the fired and unfired condition. The product so produced is superior in strength and other properties to similar articles made from dead-burned magnesite alone. I found that the green cold crushing strength of a magnesite article was increased more than 2½ times by the addition of 5 per cent of a barium cement. Similar articles fired to 2500 degrees F. showed an increase in strength of approximately 50 per cent.

Another modification of my invention involves mixing raw or unburned magnesite, barium oxide, and silica and heating to a high temperature. In heating, the magnesite is first decomposed to magnesium oxide and carbon dioxide. The latter passes off as a gas, while the resulting magnesium oxide is porous in nature. As the temperature is increased the BaO and SiO2 unite to form barium silicate. I can so select the ratio of BaO to SiO2, that before the porous magnesium oxide formed by decomposition of the raw magnesite shrinks to the so-called dead-burned condition a liquid phase of barium silicate is present which penetrates into the body of the magnesia. In this way, the interior of the magnesia particles become impregnated with barium silicate. Likewise, the outsides of the particles become coated. I fire to a predetermined dead-burned condition. The product so produced, therefore, simulates that made by fusion and solidification. It is highly refractory, cementitious in nature, is characterized by the grains being coated with and interpenetrated by barium silicate, and possesses other desirable physical and chemical properties. As in the case of fused material, I may govern firing shrinkage of certain bodies by control of the BaO:SiO2 ratio. While the volume stability at high temperatures may not be so good as that produced by fusion, for many purposes it can be used in place of the fused material, and can be produced at a lower cost.

My invention, therefore, contemplates production of a refractory comprising magnesium oxide, barium oxide, and silica. It may be made by fusion of the ingredients or by burning, to a high temperature, mixtures of raw magnesite, barium oxide and silica. In some instances, I may even add barium silicate or barium oxide and silica to dead-burned magnesite.

The amount of barium silicate in the MgO-BaO-SiO2 mass is not critical. I have worked with masses in which the sum of the barium oxide and silica was as much as 35 per cent of the entire mass. I believe that barium silicate should be present at least to the extent of 5 per cent of the entire mass, although for some purposes as low as 2 per cent may be employed. I prefer in most instances to have the sum of the barium oxide and silica lie between 10 and 20 per cent.

My invention contemplates the use of either pure materials or those of commercial purity. It is not necessary to use pure oxides although they may be used. I may use commercial grades of dead-burned magnesite, or I may use any compound of magnesium which on heating decomposes to the oxide. I may, for example, use raw magnesite or brucite. I may use natural occurring magnesium silicates such as olivine or serpentine as part of the raw material charge.

As a source of barium oxide, I may use commercial varieties. In the fusion step, I may use barium carbonate or barium sulphate. Barium sulphate is sometimes preferred, however, because of its low cost. In an electric furnace, barium sulphate decomposes and the sulphur is eliminated largely as sulphur dioxide. As a matter of fact, I may use any salt of barium which, under the conditions employed, decomposes to or forms oxide.

In the modification of my invention involving heating of raw magnesite, barium oxide, and silica, I prefer to add the barium oxide in the form of carbonate. Because of its insolubility in water, it does not cause the mass to cake, and has given better results than the oxide. I may also use barium sulphate.

For silica, I may use commercial varieties of silica or ganister. This is true for all forms of my invention disclosed herein.

When commercial varieties of the raw materials are used, the product will inevitably have certain impurities. The existence of these impurities will not remove the product from the scope of my invention. In fact, I sometimes find it desirable to add a small amount of aluminum oxide and iron oxide or either of them to the mass, if the raw materials are low in these ingredients. Use of the usual amount of lime present in commercial magnesites is within the scope of my invention.

Since MgO-BaO-SiO₂ is cementitious it may be ground to a fine state of subdivision and used to bond other refractory articles. For example, I have successfully added material made by my invention to grain magnesite, and the resulting product had properties markedly superior to those of similar products made from grain magnesite alone.

My invention has numerous advantages. It is particularly important because it produces a refractory material for use in lining furnaces. Thus, when used for this purpose the cementitious nature of the fused grains of my material eliminates the necessity of using a binder which is less basic or less refractory. It eliminates the danger prevalent where finely ground magnesia is used as a binder because the material does not disintegrate in the cooler parts of the lining. When used in bottoms of basic openhearth furnaces, addition of slag is unnecessary. Not only is the bottom thus more refractory but the time of installation is decreased.

When used to form brick numerous advantages also result from my refractory composition. If the brick is to be produced from fused grains of my material, these grains are inherently less porous and less subject to shrinkage upon subsequent subjection to high temperatures. Moreover, on the addition of water the cementitious and hydraulic nature of the barium silicate present becomes effective with the result that the grains are bound together by the setting of this cement and the brick are strong physically so that they can be handled without the exercise of undue care. This facilitates the use of the brick either in the unfired or fired state. If the unfired brick is used in a furnace, the hydraulic bond is converted to a ceramic bond in those portions thereof which are subjected to high temperature.

Where my refractory material is produced by mixing raw or unburned magnesite, barium oxide, and silica and heating to a high temperature, in the manner described above, the impregnation of the magnesia particles and the coating thereof with the barium silicate results in a product which, in qualities, closely approximates that made by fusion and solidification. It is highly refractory, cementitious in nature and possesses other desirable physical and chemical properties. Likewise, it is comparatively low in cost.

Various other advantages will appear from the above description and the appended claims.

In the claims, the terms "barium oxide" or "magnesium oxide" are to be interpreted in their broad sense and include those salts of barium or magnesium which, under the condition employed, decompose to or form the oxide.

Having thus described my invention, what I claim is:

1. The method of making a refractory material which comprises mixing raw magnesite, barium oxide and silica in such proportions that on subsequent heating the resulting product will be characterized by having magnesium oxide as its principal constituent, and heating to effect decomposition of the magnesite, combination of the barium oxide and silica followed by dead-burning of the magnesia.

2. The method of making a refractory material which comprises mixing raw magnesite, barium oxide and silica in such proportions that on subsequent heating the resulting product will contain from 2 to 35 per cent of barium oxide and silica, and heating to effect decomposition of the magnesite, combination of the barium oxide and silica followed by dead-burning of the magnesia.

3. The method of making a refractory material which comprises mixing raw magnesite, silica and a member selected from the group consisting of barium carbonate and barium sulphate in such proportions that on subsequent heating the resulting product will contain from 2 to 35 per cent of barium oxide and silica, and heating to effect decomposition of the magnesite and barium carbonate or barium sulphate, combination of the silica and barium oxide formed by decomposition of the barium carbonate or barium sulphate and followed by dead-burning of the magnesia.

4. The method of making a refractory material whih comprises mixing raw magnesite, barium oxide and silica in such proportions that on subsequent heating the resulting product will contain from 2 to 35 per cent of barium oxide and silica with a molecular ratio of the barium oxide to silica of not more than 2 to 1, and heating to effect decomposition of the magnesite, combination of the barium oxide and silica followed by dead-burning of the magnesia.

5. The method of making a refractory material in which magnesium oxide is the chief constituent and barium oxide and silica are minor constituents, which comprises mixing raw magnesite, barium oxide and silica, with the barium oxide and silica in such proportions that by application of heat barium silicate forms and assumes a state of fluidity permitting it to penetrate the magnesium oxide resulting from decomposition of magnesite before the latter shrinks to a dead-burned condition, and heating to effect decomposition of the magnesite, combination of the barium oxide and silica, followed by dead-burning of the magnesia.

6. The method of making a refractory material which comprises mixing raw magnesite, barium oxide and silica with the raw magnesite as the chief constituent and with the barium oxide and silica in such proportions that by application of heat barium silicate forms in an amount of from 2 to 35 per cent of the entire mass and assumes a state of fluidity permitting it to penetrate the magnesium oxide resulting from decomposition of the magnesite before the latter shrinks to a dead-burned condition, and heating to effect decomposition of the magnesite, combination of the barium oxide and silica, followed by dead-burning of the magnesia.

7. The method of making a refractory material which comprises mixing raw magnesite, barium oxide, silica, and a member selected from the group consisting of iron oxide and aluminum oxide, in such proportions that on subsequent heating the resulting produce will be characterized by having magnesium oxide as its principal constituent and will contain from 2 to 35 per cent of barium oxide and silica, and heating to effect decomposition of the magnesite, combination of the barium oxide and silica followed by dead-burning of the magnesia.

8. The method of making a refractory material which comprises mixing magnesium oxide, barium oxide and silica, the sum of the barium oxide and silica ranging from 2 to 35 per cent of the entire mass, and heating to effect combination of the barium oxide and silica.

9. The method of making a refractory material which comprises mixing magnesium oxide, barium oxide and silica, the sum of the barium oxide and silica ranging from 2 to 35 per cent of the entire mass with a molecular ratio of the barium oxide to silica of not more than 2 to 1, and heating to effect combination of the barium oxide and silica.

10. The method of making a refractory material which comprises mixing raw magnesite, barium oxide and silica in such proportions that on subsequent heating the resulting product will contain from 5 to 35 per cent of barium oxide and silica, and heating to effect decomposition of the magnesite, combination of the barium oxide and silica followed by dead-burning of the magnesia.

11. The method of making a refractory material which comprises mixing raw magnesite, barium oxide and silica in such proportions that on subsequent heating the resulting product will contain from 10 to 25 per cent of barium oxide and silica, and heating to effect decomposition of the magnesite, combination of the barium oxide and silica followed by dead-burning of the magnesia.

12. The method of making a refractory material which comprises mixing raw magnesite, barium oxide and silica in such proportions that on subsequent heating the resulting product will be characterized by having magnesium oxide as its principal ingredient and heating to effect decomposition of the magnesite and chemical union of the barium oxide and silica.

13. The method of making a refractory material comprising magnesia and barium silicate in which magnesia is the principal ingredient which comprises mixing magnesite, barium oxide and silica and heating.

14. The method of making a refractory material in which magnesium oxide is the principal ingredient which comprises mixing magnesite and barium silicate, and heating.

JOHN D. SULLIVAN.